United States Patent
Areljung et al.

(10) Patent No.: US 12,262,459 B2
(45) Date of Patent: Mar. 25, 2025

(54) METHOD FOR OPERATING A COOKING APPLIANCE

(71) Applicant: ELECTROLUX APPLIANCES AKTIEBOLAG, Stockholm (SE)

(72) Inventors: Daniel Areljung, Stockholm (SE); Christoph Walther, Rothenburg ob der Tauber (DE); Goran Kurt, Stockholm (SE)

(73) Assignee: Electrolux Appliances Aktiebolag, Stockholm (SE)

( * ) Notice: Subject to any disclaimer, the term of this patent is extended or adjusted under 35 U.S.C. 154(b) by 1059 days.

(21) Appl. No.: 17/256,359

(22) PCT Filed: Jun. 25, 2019

(86) PCT No.: PCT/EP2019/066775
§ 371 (c)(1),
(2) Date: Dec. 28, 2020

(87) PCT Pub. No.: WO2020/011523
PCT Pub. Date: Jan. 16, 2020

(65) Prior Publication Data
US 2021/0227650 A1 Jul. 22, 2021

(30) Foreign Application Priority Data

Jul. 9, 2018 (EP) .................................... 18182342

(51) Int. Cl.
*H05B 6/64* (2006.01)
*G06N 20/00* (2019.01)
*H05B 6/66* (2006.01)

(52) U.S. Cl.
CPC ......... *H05B 6/6438* (2013.01); *H05B 6/6441* (2013.01); *H05B 6/668* (2013.01); *G06N 20/00* (2019.01)

(58) Field of Classification Search
CPC .. H05B 6/6438; H05B 6/6441; H05B 6/6435; H05B 6/668
See application file for complete search history.

(56) References Cited

U.S. PATENT DOCUMENTS

| | | | |
|---|---|---|---|
| 10,009,963 B1* | 6/2018 | Thrun | G06K 7/10366 |
| 2016/0057816 A1* | 2/2016 | Alias | H05B 6/6438 |
| | | | 219/679 |
| 2016/0081515 A1* | 3/2016 | Aboujassoum | F24C 7/083 |
| | | | 434/127 |
| 2016/0147208 A1* | 5/2016 | Shinomoto | G05B 15/02 |
| | | | 700/83 |
| 2018/0146811 A1* | 5/2018 | Grimaldi | A47J 36/00 |

FOREIGN PATENT DOCUMENTS

| | | |
|---|---|---|
| CN | 107077529 | 8/2017 |
| EP | 1041860 | 10/2000 |
| EP | 3151171 | 4/2017 |
| JP | 2009054042 | 3/2009 |
| WO | 2016070232 | 5/2016 |
| WO | 2016071854 | 5/2016 |

OTHER PUBLICATIONS

English Translation of Office action in counterpart application No. CN 201980043308..5 dated Jan. 19, 2023, 9 pages.
International Search Report and Written Opinion for PCT/EP2019/066775, dated Sep. 24, 2019, 10 pages.

* cited by examiner

*Primary Examiner* — Brian W Jennison
(74) *Attorney, Agent, or Firm* — Chrisman Gallo Tochtrop LLC

(57) ABSTRACT

A method for operating a cooking appliance, comprising: (a) providing a database with operating parameters of the cooking appliance; (b) obtaining recipe data from a recipe source; (c) extracting cooking process parameters from the obtained recipe data; (d) determining adapted cooking parameters by evaluating the extracted cooking process parameters in light of data from the database, and optionally of settings made by a user; and (e) operating the cooking appliance based on the adapted cooking parameters.

18 Claims, No Drawings

METHOD FOR OPERATING A COOKING APPLIANCE

The present invention relates to a method for operating a cooking appliance.

In conducting a cooking process the user has to input at the cooking appliance a number of cooking process parameters, such as temperature or power level and duration. Depending on the type of cooking appliance employed, the user further has to select various further parameters, such as in a hob the size and shape of the cooking zone used for heating, or in an oven a program, the type of heating such as convective heating, top and/or bottom heating, and addition of steam.

While there are many online databases available with recipes for all kind of food, when wishing to put a certain recipe into practice, the user has to adapt the details of the recipe to the specific situation, such as the number of servings to be cooked, and then has to adapt the cooking parameters to the particular cooking appliance used.

In EP 1041860 A2 there is suggested a microwave oven which may communicate with a relay box that also communicates with a personal computer. The personal computer can be connected via the internet to a host computer storing a plurality of cooking recipes which include control data for heating and cooking the cooking recipe by the microwave oven, which control data can be transferred to the microwave oven.

The approach suggested in EP 1041860 A2 is disadvantageous in that the user may not freely search on the internet for recipes but instead is limited to recipes that specifically are designed for use in a microwave oven. Furthermore, the approach suggested in EP 1041860 A2 does not take into consideration particulars of the cooking appliance used, i.e. does not take into account when using the same cooking process parameters in different cooking appliances, different cooking results may be achieved.

In view of the above, it is an object of the present invention to provide for a method for operating a cooking appliance, which facilitates the cooking process, and which particularly facilitates applying recipe instructions to the particular cooking appliance used.

The above object is solved by the present invention which provides a method for operating a cooking appliance, which method comprises:
  (a) providing a database with operating parameters of the cooking appliance;
  (b) obtaining recipe data from a recipe source;
  (c) extracting cooking process parameters from the obtained recipe data;
  (d) determining adapted cooking parameters by evaluating the extracted cooking process parameters in light of data from the database, and optionally of settings made by a user; and
  (e) operating the cooking appliance based on the adapted cooking parameters.

In such method a database is provided n which data for the particular cooking appliance is stored. Such data preferably comprises the type of cooking appliance, the manner of heating, such as in an oven convection heating, steaming, microwave heating, etc., and user preferences. In addition to such general operational data, the data in the database preferably contains data of a variety of cooking operations that can be used as basis or as comparative data for a particular cooking operation to be carried out. As will be explained in further detail below, the database preferably is continuously updated, in particular by using machine learning algorithms, so-called artificial intelligence, so that by repeatedly applying such algorithms the system is able to continuously learn, improve and optimize cooking procedures to be carried out in a particular cooking appliance and further taking also into consideration preferences of a particular user.

Before starting a cooking procedure recipe data is obtained from a recipe source, which particularly can be an online source, such as a website with cooking recipes, a cooking video, or the like.

Upon having obtained recipe data, cooking process parameters, such as an oven temperature and a cooking time, are extracted from the obtained data.

Using data from the database, and optionally further taking into consideration settings made by the user, the extracted cooking process parameters are evaluated so as to determine adapted cooking parameters which thus specifically are adapted for the particular cooking appliance and the particular user. That is, whereas a selected recipe, for example, may be for a six servings meal to be prepared in a convection oven, if the cooking appliance is a steam oven which information is stored in the database, and if the user provides input that the meal is to be prepared for four servings, the cooking process parameters automatically are recalculated for this particular case.

Upon having thus determined adapted cooking parameters, the cooking appliance then is operated based on these adapted parameters.

The present invention thus provides a method for operating a cooking appliance, in which recipe data are obtained from a recipe source, such as an online source, which recipe data then automatically is adapted to the particular cooking appliance, wherein by employing a database that continuously can be fed with data that is tailored to the particular cooking appliance as well as to user preferences, there is provided for the capability to continuously adapt and optimize the cooking procedures, to thus find out ideal settings such as temperature, duration and oven program, tailored for the consumer's specific appliance.

In order to provide for a learning capability so as to gradually improve the database to better fit the stored cooking process parameters to the particulars of the cooking appliance and the preferences of the user, the method preferably further comprises recording operation data of the cooking process and storing the recorded data, optionally after further processing, in the database.

Thus, whereas in prior art methods and systems the user has to enter settings for the cooking appliance manually, wherein in order to optimize a cooking process the user would need to keep track of the previously used recipes manually, in preferred embodiments of the present method in which operation data of the cooking process are recorded, optionally further processed, and then stored in the database, the database thus automatically adapts to the preferences of the user.

To arrive at ideal oven settings, the method preferably comprises applying a machine learning algorithm on the recorded operation data and storing data obtained by the machine learning algorithm in the database. The recorded operation data, which in addition to cooking process parameters includes recipe data, thus preferably is employed to adapt, expand and improve already stored data. While particularly in an initial phase the database may be trained using a number of existing recipes, the further analysis of recipes can be performed using a machine learning approach in which the recipe knowledge collected in the database is used to compare imported recipes to existing ones, and based on key metrics propose recommended settings.

In order to adapt the recipe data to personal preferences of a user the method further may comprise interrogating the user for cooking process parameters basic to the determination of the adapted cooking parameters. That is, while the method establishes a set of recommended settings, the method can provide the user with an opportunity to modify these settings according to personal preferences. For example, if the method is used to operate the cooking appliance for roasting meat, the user may be asked to choose between the options "rare", "medium rare", "medium", and "well done".

In preferred embodiments of the method, cooking process parameters basic to the determination of the adapted cooking parameters are presented to a user. That is, parameters may be presented to the user that influence the adaption of the cooking parameters that have been retrieved, so that the user may check whether further adaptions are required.

The method suggested herein can be employed with particular advantage when the determination of the adapted cooking parameters comprises converting cooking parameters that apply to a first heating method to adapted cooking parameters for use in a second heating method.

For example, if the cooking appliance is a steam oven, the user is not restricted to searching for steam oven recipes, but rather may use for example a convection oven recipe, the cooking parameters of which thus are converted to apply for a steam oven. Hence, the choice of recipes is largely expanded and erroneous operation of the cooking appliance based on an unsuitable recipe is avoided.

The recipe source may comprise any source from which recipe data can be obtained, such as an internet source, in particular an online database with recipes, a cooking website, an online audio, video or text source, an audio signal, such as a radio broadcast signal or a microphone signal, a video signal, such as a television program, or an OCR readable text.

In dependency of the recipe source, the method in the step of obtaining recipe data involves at least one of web scraping, speech recognition, image recognition, and optical character recognition (OCR). The present method thus is not restricted to accessing a database that contains recipe data that already is tailored to the particular cooking appliance, but instead may use any kind of data retrieval by which cooking process parameters can be extracted from the signal obtained from the recipe source.

To obtain detailed information on the type and amount of ingredients to be used, of actions to be taken, of parameters to be set, of cooking utensils to be employed, etc. the step (c) of extracting cooking process parameters from the obtained recipe data preferably involves parsing the obtained recipe data, i.e. a step of analyzing and grammatically dissecting the obtained recipe data.

The recipe data may comprise any data that is needed or might be helpful in determining optimal cooking process parameters and conducting such cooking process. The recipe data thus may comprise data as regards type of ingredients, volume and/or weight of individual ingredients or of a total of any subset of ingredients, number of servings, type of cooking appliance, heating mode, type of cooking such as baking, frying, steaming, sous vide, etc., cooking style such as Italian, French, Cajun, Mexican, etc., type of cooking vessel and/or accessories used, predefined cooking programs, and individual cooking parameters such as temperature, temperature profile over time, duration of cooking steps, and size and shape of cooking zone.

Whereas the present method may be carried out in the cooking appliance as such, in preferred embodiments steps (a) to (d) are carried out in a remote device that continuously and/or on demand communicates with the cooking appliance, from which the adapted cooking parameters are transmitted to the cooking appliance, and to which optionally settings of the cooking appliance that are made by a user are transmitted.

In such preferred embodiments the remote device can be a personal device, such as a mobile phone, a tablet, a notebook, a personal computer, or a smart home system, or alternatively the remote device can be a multi-user database system which is operated remotely by a service provider. Thus, while the entire process of obtaining recipe data, extracting cooking process parameters from the obtained recipe data, and determining adapted cooking parameters by evaluating the extracted cooking process parameters all can be performed on a personal device, these steps also all can be performed remotely by a service provider, wherein the personal device only serves as interface for communication with a remote service, i.e. is used for data entry by a user and for displaying data to the user.

In such embodiments the present method can be implemented as an App that is run on a personal device of the user, for example a mobile phone, which is used for example for searching a recipe, wherein upon the user having determined a recipe source that contains suitable recipe data, the mobile phone may send a corresponding request to a remote service which then obtains the recipe data and processes such data to generate a set of suitable cooking process parameters which are sent from the remote service to the user or directly to the cooking appliance. Also the data processing can be made partially or completely either in the cooking appliance itself, in a separate device that communicates with the cooking appliance, and/or by a remote service.

In view of the above, a cooking appliance configured for use in the method of the present invention may comprise in the most simple case merely a communication interface which allows operational parameters that are generated at a remote device, such as a personal device or a remote service, to be sent to the cooking appliance so that the cooking appliance can be operated based on such parameters.

In a further sophisticated embodiment, the communication interface is a bidirectional interface which allows transmitting operational parameters from the cooking appliance to the remote device, so as to provide feedback to the remote device of the cooking process as actually conducted. Such feedback data may be used in a self-learning approach so as to optimize and personalize similar future cooking operations.

While in such embodiments the user interface, i.e. the input of data by a user and the presentation of data to a user, may be implemented in a separate device, such as a mobile phone, in other embodiments the cooking appliance is equipped with a user interface, such as a touchscreen panel, which allows a user to input a recipe search request, to select a desired recipe, and to display various data to the user. In such embodiments, access to an online source can be provided either by direct connection via a respective communication interface provided at the cooking appliance, or by configuring the cooking appliance to communicate with a network, such as via LAN or WLAN with a home communication network.

While thus there are various levels of integration of communication and processing means into the cooking appliance, the same applies to the storage means for storing the database with operating parameters of the cooking appliance, which storage means can be provided at least in one of the cooking appliance as such, in a separate personal device, such as a mobile phone, or in a remote device or at a remote service provider.

The invention claimed is:

1. A method for operating a cooking appliance, comprising:
   (a) providing a database with data for the cooking appliance, wherein step (a) is carried out by the cooking appliance or a remote device;
   (b) obtaining recipe data from a recipe source, wherein step (b) is carried out by the cooking appliance or the remote device;
   (c) extracting cooking process parameters from the obtained recipe data, wherein step (c) is carried out by the cooking appliance or the remote device;
   (d) determining adapted cooking parameters by evaluating the extracted cooking process parameters in light of data from said database with data, and optionally of settings made by a user, wherein step (d) is carried out by the cooking appliance or the remote device;
   (e) operating the cooking appliance based on the adapted cooking parameters, wherein step (e) is carried out by the cooking appliance; and
   (f) recording operation data of the cooking process and storing the recorded data in said database with data that is used to determine the adapted cooking parameters, wherein the recorded data is optionally further processed before being stored in said database, wherein step (f) is carried out by the cooking appliance or the remote device.

2. The method of claim 1 further comprising a step of interrogating a user for cooking process parameters basic to the step (d) of determining adapted cooking parameters, wherein the step of interrogating is carried out by the cooking appliance or the remote device.

3. The method of claim 1 further comprising a step of presenting cooking process parameters basic to the step (d) of determining adapted cooking parameters to a user, wherein the step of presenting cooking process parameters is carried out by the cooking appliance or the remote device.

4. The method of claim 1, wherein the step (d) of determining adapted cooking parameters comprises converting cooking parameters that apply to a first heating method to adapted cooking parameters for use in a second heating method.

5. The method of claim 1, wherein the recipe source comprises an internet source, an audio signal, a video signal, or an OCR readable text.

6. The method of claim 1, wherein step (b) comprises at least one of web scraping, speech recognition, image recognition, and optical character recognition (OCR).

7. The method of claim 1, wherein step (c) comprises parsing the obtained recipe data to extract said cooking process parameters.

8. The method of claim 1, wherein the recipe data comprises data on type of ingredients, volume and/or weight of individual ingredients, number of servings, type of cooking appliance, heating mode, type of cooking vessel, predefined cooking programs, and individual cooking parameters comprising at least one of temperature, temperature profile over time, duration of cooking steps, or size and shape of cooking zone.

9. The method of claim 1, in which steps (a) to (d) are carried out in the remote device, which transmits the adapted cooking parameters to the cooking appliance.

10. The method of claim 9, in which the cooking appliance transmits settings of the cooking appliance made by the user to the remote device.

11. The method of claim 9, in which the remote device is a personal device selected from among a mobile phone, a tablet, a notebook, a personal computer, or a smart home system.

12. The method of claim 9, in which the remote device is a multi-user database system operated by a service provider.

13. A cooking appliance configured to execute the method of claim 1.

14. A method for operating a cooking appliance, comprising:
    (a) obtaining recipe data from a recipe source remote from the cooking appliance for cooking a first food item, wherein step (a) is carried out by the cooking appliance or a remote device;
    (b) extracting cooking process parameters from the obtained recipe data including a first heating method for cooking the first food item, wherein step (b) is carried out by the cooking appliance or the remote device;
    (c) interrogating a database with data for the cooking appliance and determining adapted cooking parameters, including a second heating method different from said first heating method, by evaluating the extracted cooking process parameters in light of data from said database with data, and optionally from a user setting, wherein step (c) is carried out by the cooking appliance or the remote device;
    (d) operating the cooking appliance based on the adapted cooking parameters to execute a cooking process to cook the first food item, wherein step (d) is carried out by the cooking appliance; and
    (e) recording operation data of the cooking process and storing the recorded operation data in said database with data that is used to determine the adapted cooking parameters, thereby automatically adapting the database to preferences of a user of the cooking appliance, wherein the recorded operation data is optionally further processed before being stored in said database with data, wherein step (e) is carried out by the cooking appliance or the remote device.

15. The method according to claim 14, said extracted cooking process parameters being adapted to said first heating method, and being converted therefrom in order to apply to said second heating method as part of the adapted cooking parameters.

16. The method of claim 14, steps (a) through (c) being carried out in the remote device, wherein the adapted cooking parameters are communicated from the remote device to the cooking appliance via a wireless network.

17. The method of claim 16, step (e) also being carried out in the remote device.

18. The method of claim 1, wherein the cooking process parameters extracted from the obtained recipe data comprise an oven temperature or a cooking time.

* * * * *